Jan. 14, 1930.  W. M. CHESNUTT  1,743,757
DOUBLE WHEEL CASTER
Filed Nov. 21, 1927
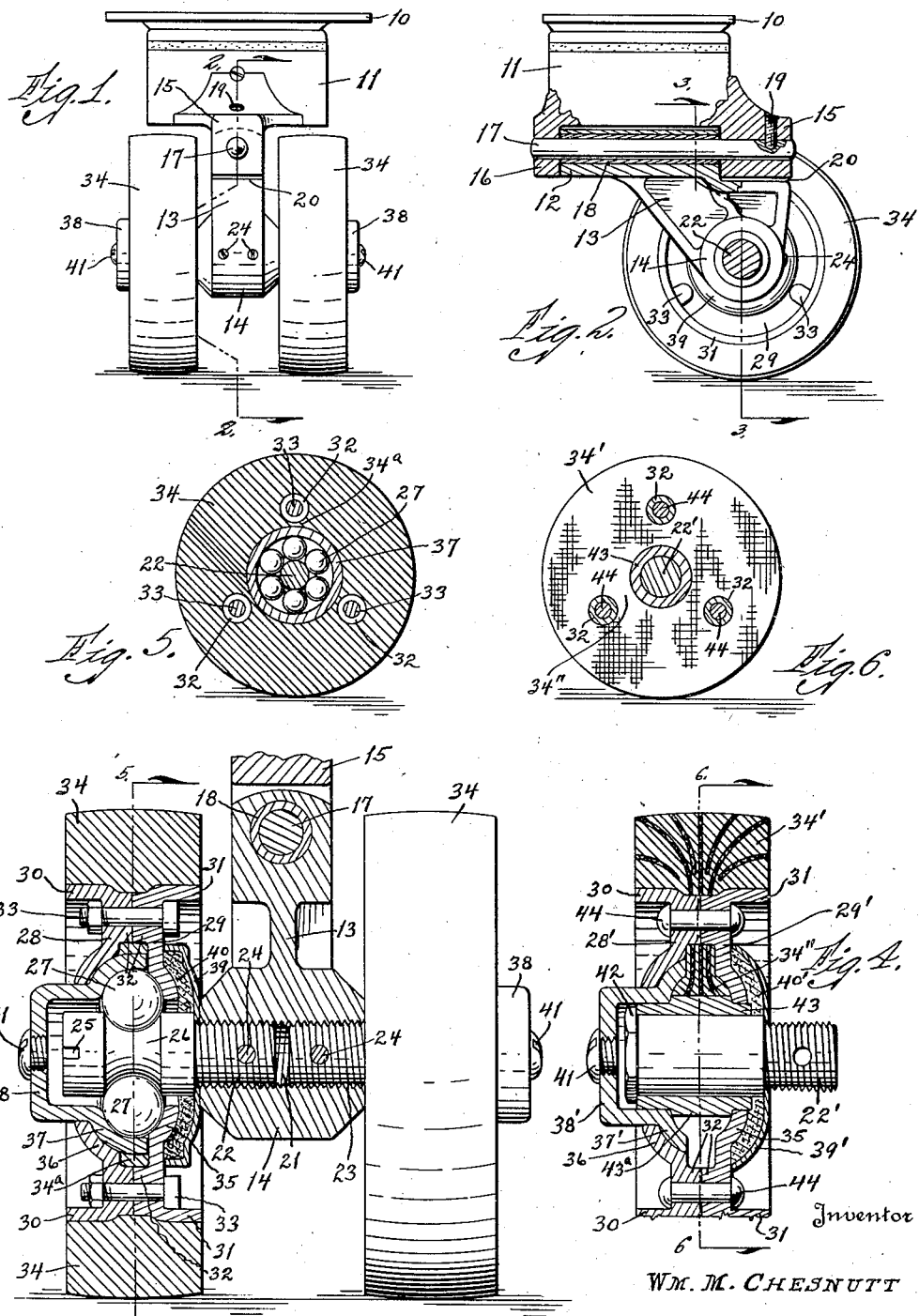
Inventor
WM. M. CHESNUTT
By Earl M. Sinclair
Attorney Patented Jan. 14, 1930

1,743,757

UNITED STATES PATENT OFFICE

WILLIAM MORTON CHESNUTT, OF FRESNO, CALIFORNIA, ASSIGNOR TO JOHN LOUCIEN CHESNUTT, OF LONG BEACH, AND FISK MARK RAY, OF OAKLAND, CALIFORNIA

DOUBLE-WHEEL CASTER

Application filed November 21, 1927. Serial No. 234,725.

The object of this invention is to provide an improved construction for a twin or double-wheel for casters and the like and an improved means for mounting the same.

A further object of this invention is to provide a double-wheel construction which is simple and economical to manufacture and efficient in use.

Another object of the invention is to provide a wheel of the class described which may be rigidly and securely assembled and yet readily taken apart for the purpose of renewing the tread, bearings, or other parts.

Still another object is to provide a wheel having a string-proof and dirt-proof guard for the inner hub to assist in excluding foreign substances and also to act as a grease retainer to improve the lubrication of the bearings.

Another object of this invention is to provide such a wheel which possesses excellent service qualities and is composed of members which are simple in form and require comparatively few operations in their manufacture; which are easily and quickly assembled so as to result in a structure that is rigid, strong and durable and also which is so arranged that various substitutions of parts may be made at minimum cost.

With these and other objects in view, my invention consists in the construction, arrangement and combination of elements hereinafter set forth, pointed out in the claims and indicated by the accompanying drawing in which—

Fig. 1 is a rear elevation of a double-wheel caster embodying my improvements.

Fig. 2 is a vertical section on the line 2—2 of Fig. 1.

Fig. 3 is an elevation partly in section on the line 3—3 of Fig. 2, showing the method of mounting the wheels on the wheel-carrying member and also illustrating in detail, the construction of a ball bearing wheel.

Fig. 4 is a cross section through a wheel of modified construction illustrating a plain bearing for the wheel and also illustrating a different type of tread member.

Fig. 5 is a circumferential section through the ball bearing wheel on the line 5—5 of Fig. 3.

Fig. 6 is a circumferential section through the plain bearing wheel on the line 6—6 of Fig. 4.

In many types of swivel casters, it is desirable to provide a double or twin wheel for each caster in order to provide a broad bearing surface on the floor and yet reduce to a minimum, the actual width of the floor engaging surface so as to reduce wear on the floor or floor covering and also facilitate swiveling. One advantage of a twin wheel caster is that the outer wheel of the pair rolls on its axle in the swiveling operation instead of turning on its perpendicular center as the inner wheel of the pair must do and as a single wheel swivel caster must do. A twin wheel swivel caster whose wheels have a combined width of tread equal to the tread of a single wheel caster, swivels more easily than such single wheel caster, other things being equal, because of the much smaller resistance between the floor and the tread on which the caster rotates or turns and because it requires less leverage to swivel by the rolling action of the outer twin wheel than it would by turning a wheel of wider tread.

I have shown a swivel caster embodying a plate 10 adapted to be attached in any suitable manner to a load object and having a swivel connection with a substantially cylindrical housing 11. This swivel connection may be of any suitable construction, such for instance as is illustrated, described, and claimed in my companion application filed the 19th day of September, 1927, Serial Number 220,371. Pivotally connected to the lower portion of the housing 11 is a wheel-carrying member comprising a longitudinally arranged bearing portion 12, a web 13 formed on and extending downwardly from the bearing portion and a boss or enlarged portion 14 carried at the lower end of the web. The housing 11 is formed with downwardly projecting bosses 15 and 16 which are spaced apart and arranged to receive between them, the bearing portion 12 of the wheel-carrying member. The bosses 15 and 16 are formed with registering apertures through which a hinge pin 17 is mounted, said hinge pin also extending through the bearing portion 12 of the wheel-carrying member, whereby said wheel-carrying member has a limited lateral oscillation on said pin and relative to the housing 11. If desired, a hardened bushing 18 may be mounted in the bearing portion 12 to receive the actual contact with the pin 17, which also may be hardened if deemed necessary. A set screw 19 is threaded in the boss 15 and is adapted to engage the pin 17 to hold it against turning. The wheel-carrying member has a horizontal shoulder or ledge 20 formed on its web portion 13 below and slightly spaced from the lower face of the boss 15, which face also is arranged in a horizontal plane. This permits contact of the horizontal surface of the shoulder 20 with the horizontal surface of the boss 15 at times to limit the lateral oscillation of the wheel-carrying member when the wheels are passing over uneven floor surfaces. It also insures that the wheels will remain in approximately horizontal position if the load object on which the caster is mounted be lifted from the floor, and thus insures that the wheels will be ready to resume proper position on the floor.

The boss or enlarged member 14 of the wheel-carrying member is formed with a transverse bore 21 which is internally threaded. Separate axles 22 and 23 are provided for the wheels of the caster and said axles are reduced and threaded at their inner end portions and are adapted to be screwed into the bore 21 of the boss 14 and held by means of pins or set screws 24. As shown in Fig. 3, each of the axle members is formed at its outer end with a kerf 25 to receive a screw driver for the operation of mounting the axle in the boss. In the ball bearing construction shown in Figs. 3 and 5, each axle such as 22 is formed with a peripheral groove 26 within which a series of bearing balls 27 project. This groove 26 is substantially midway of the projecting portion of the axle 22 and the balls 27 are arranged substantially on the median line of the wheel. Each wheel is composed of a pair of side plates 28 and 29 of annular form having at their outer peripheries, substantially horizontal flanges 30 and 31 which form a rim for the wheel when assembled. The side plates 28 and 29 are formed with a plurality of inwardly projecting apertured bosses 32, in this instance three in number and the bosses of the two side plates are arranged to register and to contact with each other at their inner ends. The apertured bosses 32 are designed to receive securing means such as bolts 33 by means of which the side plates are clamped together and the parts of the wheel are held in assembled relation. A suitable tread member 34 is mounted on the rim formed by the flanges 30 and 31 of the side plates and any suitable means may be provided for holding said rim in place. In the form shown in Figs. 3 and 5, the tread member 34 is of solid or integral construction and has a portion 34ª projecting inwardly of the bosses 32, whereby the bolts 33 serve to hold the tread member firmly in place. The innermost side plate 29 is formed at its inner periphery with a concavo-convex ball race 35 which contacts with the inner side surfaces of the bearing balls 27. The outermost side plate 28 also is formed at its inner periphery with a concavo-convex portion 36 which engages and holds in place a separate ball race member 37 engaging the outer lateral sides of the balls 27. Integrally formed on the ball race 37 and extending outwardly past the outer side plate and inclosing the outer end of the adjacent axle 22 or 23 is a hub cap 38. Mounted on the inner end portion of each axle 22 or 23 and engaging the adjacent face of the boss 14, is a plate 39 which serves as a guard against the entrance of dirt, strings, and other foreign substances. A resilient washer 40 of felt or other suitable substance preferably is mounted between the guard plate 39 and the side plate 29 and held in any suitable manner. This washer assists in excluding dirt, water and other foreign substances, but more particularly it acts as a grease retainer and permits the bearing portion of the wheel to be employed as a cavity for cup grease. The hub cap 38 may be provided with a threaded aperture closable by a screw 41, to permit the insertion of grease at times.

The single roll of bearing balls 27 of relatively large size and located at the median line of the wheel provides an efficient and economical anti-friction bearing for the wheel which also relieves the friction due to side thrust and the engagement of said balls in the groove 26 of the axle serves to hold the wheel and axle in assembled relation.

In the construction according to Figs. 4 and 6, an axle 22' is provided which is mounted in the same manner as previously described, but said axle is formed at its outer end with an enlarged head 42 of angular form adapted to be engaged by a wrench for tightening the axle into the boss. In this construction, the ball bearings are omitted and a plain bearing sleeve 43 is mounted on the axle 22' and is formed with a central enlargement 43ª which serves as a spacing means for the side plates 28' and 29' which are similar to the construction previously described. In this construction, rivets 44 are used for holding the side plates together in assembled relation and for holding the hub cap 38' in place. In this construction, the head 42 of the axle serves to hold the wheel and axle in assembled relation. In this construction I have shown also, a different form of tread member 34' which is composed of fabric or rubber and fabric or other suitable flexible composition. This tread construction as well as some other features of the wheel shown and described in this application are specifically illustrated, described, and claimed in my companion aplication executed the fifth day of October, 1927, and about to be filed in the Patent Office. The tread member 34' is also formed with an inward extension or bead 34" which is clamped between the side plates and held by the bosses thereof and the rivets 44. In using a tread of this type, it is quite important that ample clamping means be provided, as from the nature of the tread member it is more or less resilient and inclined to pull away from the wheel rim after having been in use for some time. In Fig. 4, I have shown a modified form of guard plate 39' which is adapted to be clamped between the boss and adjacent shoulder of axle 22' and the absorbent washer 40' is simply clamped between said guard plate and the adjacent side plate 29' of the wheel.

It is obvious that I have provided a design which may be adapted to plain bearings, ball bearings, or other types of bearings without many changes in the wheel parts, thereby making the wheel readily adapted to a large variety of use and extending its field of service without unduly increasing manufacturing costs. For instance, the side plates in the different constructions may be substantially duplicates of each other and very little change is required in the hub cap, the principal difference being in the bearings themselves and in the axle member. It is also obvious that various forms of treads may be used interchangeably on the wheel with either kind of bearing.

The hinged connection between the load bearing member and the wheel-carrying member enables both wheels to remain in contact with the floor while passing over uneven surfaces, thus reducing strain and wear on the parts involved.

I claim as my invention:

1. In a double-wheel caster, a wheel-carrying member including a portion formed with a transverse threaded bore, a pair of axle members threaded into said bore from the opposite ends thereof, and a wheel mounted for rotation on each of said axle members.

2. In a double-wheel caster, a wheel-carrying member, axles carried by and projecting from both sides of said wheel-carrying member, bearings engaging the projecting portions of said axles, a wheel mounted on the projecting portion of each axle and engaging the bearing thereof, and a guard plate mounted on each axle between the wheel-carrying member and the adjacent wheel, together with an absorbent washer mounted between each guard plate and the adjacent wheel.

3. In a double-wheel caster, a wheel-carrying member, an axle projecting in each direction from said wheel-carrying member, a bearing engaging each projecting portion of said axle, a hub cap inclosing each outer end of said axle and engaging the bearing thereof, and a wheel mounted on each projecting portion of said axle in engagement with said bearing and also having a portion engaging a portion of the adjacent hub cap and holding the same in place.

4. In a double-wheel caster, a wheel-carrying member, an axle projecting in each direction from said wheel-carrying member, a bearing engaging each projecting portion of said axle, a hub cap inclosing each outer end of said axle and engaging the bearing thereof, and a wheel mounted on each projecting portion of said axle in engagement with said bearing and also having a portion engaging a portion of the adjacent hub cap and holding the same in place, together with means for holding said bearings on said axle.

5. In a caster, a wheel-carrying member, an axle formed with a peripheral groove, a series of bearing balls engaging in the groove of said axle, a hub cap inclosing the outer end of said axle and formed with a ball race to engage the series of balls thereof, and a wheel mounted for rotation on said axle, said wheel having a ball race engaging one lateral side of the bearing balls and also formed with a portion engaging the ball race of the hub cap, the engagement of said balls in the groove of said axle serving to hold the wheel in assembled relation thereon.

6. In a caster, an axle, a bearing engaging the projecting portion of said axle, means for preventing outward movement of the bearing on the axle, a hub cap inclosing the outer end of said axle and having a portion to engage the bearing, and a wheel rotatably mounted on said axle, said wheel being formed of a pair of side plates secured together and with a tread member carried by said side plates, one side plate of said wheel being in engagement with the bearing and the other side plate being in engagement with a portion of the hub cap whereby the several parts are held in assembled relation and the wheel is free to rotate on said bearing.

7. In a caster, an axle, a bearing engaging the projecting portion of said axle, means for preventing outward movement of said bearing on the axle, a hub cap inclosing the outer end of said axle and having a portion to engage the bearing, a wheel rotatably mounted on said axle, said wheel being formed of a pair of side plates secured together and with a tread member carried by said side plates, one side plate of said wheel being in engagement with the bearing and the other side plate being in engagement with a portion of the hub cap, whereby the axle, bearing, hub cap and wheel are held in assembled relation, and a guard plate mounted on axle between the hub and the wheel and serving to exclude foreign substances from the interior of the wheel, said guard plate and the hub cap cooperating with the side plates to provide a cavity for lubricant.

8. In a caster, a bearing, a hub cap having an annular portion to engage the bearing, a wheel rotatably mounted, said wheel being formed of a pair of annular side plates secured together and with a tread member carried by said side plates, one of said side plates being in engagement at its inner margin with said bearing, the other side plate having its inner marginal portion engaging outside of the before-mentioned annular portion of the hub cap.

9. In a caster, a bearing, a hub cap having an annular portion to engage the bearing, a wheel rotatably mounted, said wheel being formed of a pair of annular side plates secured together and with a tread member carried by said side plates, one of said side plates being in engagement at its inner margin with said bearing, the other side plate having its inner marginal portion engaging outside of the before-mentioned annular portion of the hub cap, and a guard plate adjacent the first mentioned side plate of the wheel and serving to exclude foreign substances from the interior of the wheel, said guard plate and the hub cap cooperating with the side plates to provide a cavity for lubricant.

WILLIAM MORTON CHESNUTT.